United States Patent
Wright

(10) Patent No.: US 9,919,333 B2
(45) Date of Patent: Mar. 20, 2018

(54) HIGH PRESSURE WATERBLASTING NOZZLE MANIPULATOR APPARATUS

(71) Applicant: STONEAGE, INC., Durango, CO (US)

(72) Inventor: Douglas E. Wright, Durango, CO (US)

(73) Assignee: STONEAGE, INC., Durango, CO (US)

( * ) Notice: Subject to any disclaimer, the term of this patent is extended or adjusted under 35 U.S.C. 154(b) by 0 days.

(21) Appl. No.: 15/433,978

(22) Filed: Feb. 15, 2017

(65) Prior Publication Data

US 2017/0157636 A1 Jun. 8, 2017

Related U.S. Application Data

(63) Continuation-in-part of application No. 14/989,501, filed on Jan. 6, 2016, now Pat. No. 9,610,603.
(Continued)

(51) Int. Cl.
| | |
|---|---|
| *B05B 15/00* | (2006.01) |
| *B05B 15/08* | (2006.01) |
| *B08B 3/02* | (2006.01) |
| *B08B 13/00* | (2006.01) |
| *F16M 11/10* | (2006.01) |
| *F16M 11/42* | (2006.01) |
| *F16M 11/24* | (2006.01) |
| *F16M 11/20* | (2006.01) |

(52) U.S. Cl.
CPC ............ *B05B 15/08* (2013.01); *B08B 3/024* (2013.01); *B08B 13/00* (2013.01); *F16M 11/10* (2013.01); *F16M 11/2092* (2013.01); *F16M 11/24* (2013.01); *F16M 11/42* (2013.01); *F16M 2200/04* (2013.01)

(58) Field of Classification Search
CPC ......... B05B 15/08; B08B 3/024; B08B 13/00; F16M 11/10; F16M 11/2092; F16M 11/24; F16M 11/42; F16M 2200/04

USPC .................. 248/558; 134/25.4, 144, 172, 34
See application file for complete search history.

(56) References Cited

U.S. PATENT DOCUMENTS

| 3,833,175 A | 9/1974 | Pulk et al. |
|---|---|---|
| 4,064,656 A | 12/1977 | Zeidler |
| (Continued) | | |

FOREIGN PATENT DOCUMENTS

EP 2008728 12/2008

OTHER PUBLICATIONS

Extended European Search Report and Opinion, dated Dec. 14, 2017, from related European Patent Application No. EP16735363.0.
(Continued)

*Primary Examiner* — Anita M King
(74) *Attorney, Agent, or Firm* — Greenberg Traurig, LLP

(57) ABSTRACT

A high pressure nozzle manipulator includes a wheeled chassis, a pair of parallel manipulator elevator rails supported by an elevator rail rotator fastened to the chassis, a horizontal extensible arm rail disposed between and carried by the manipulator elevator rails, a rotary actuator fastened to a distal end of the horizontal extensible arm rail, and a linear actuator fastened between the first rotary actuator and a hinged nozzle support bracket. This bracket holds a high pressure cleaning nozzle. The linear actuator is configured to rotate the nozzle and the bracket through an arc. The elevator rail rotator is configured to rotate the elevator rails through an arc of about 180 degrees about a horizontal axis. The rotary wrist actuator is configured to rotate the hinged nozzle support bracket about a horizontal axis through the extensible arm rail.

20 Claims, 5 Drawing Sheets

Related U.S. Application Data

(60) Provisional application No. 62/101,668, filed on Jan. 9, 2015.

(56) References Cited

U.S. PATENT DOCUMENTS

| | | |
|---|---|---|
| 4,615,260 A | 10/1986 | Takagi et al. |
| 5,167,720 A | 12/1992 | Diamond et al. |
| 7,726,613 B2 | 6/2010 | Burnier et al. |
| 9,415,427 B2 | 8/2016 | Nilsson |
| 2002/0157690 A1 | 10/2002 | Tebbe |
| 2002/0179123 A1 | 12/2002 | Toward et al. |
| 2014/0041691 A1 | 2/2014 | Glasscock |

OTHER PUBLICATIONS

International Search Report and Written Opinion, dated May 4, 2016, from related International Patent Application No. PCT/US2016/012352.

HIGH PRESSURE WATERBLASTING NOZZLE MANIPULATOR APPARATUS

CROSS REFERENCE TO RELATED APPLICATIONS

This application is a continuation-in-part of U.S. patent application Ser. No. 14/989,501, entitled High Pressure Waterblasting Nozzle Manipulator Apparatus, filed Jan. 6, 2016, which claims the benefit of priority of U.S. Provisional Application No. 62/101,668, filed Jan. 9, 2015, the contents of which are incorporated herein by reference in their entirety.

BACKGROUND OF THE DISCLOSURE

Field of the Disclosure

The present disclosure generally relates to fluid nozzle manipulators. In particular, it relates to an apparatus for remotely holding and maneuvering a high pressure rotary nozzle around an object to be cleaned and in which the nozzle is attached to a very high pressure water source.

State of the Art

Waterblasting nozzles typically are attached to one end of rigid lance which is in turn connected to a high pressure fluid hose. The lance is hand held at its proximal end by a user/operator with its distal end at various positions to clean a surface of an object. Such lances are typically at least 4 feet long and can be as long as 15+feet long for use in some tank applications. The lance permits the user to keep a safe distance from the waterblast jet and back splatter of the jet from the surface being cleaned. However, when operating at pressures on the order of 5-20 kpsi, it is difficult to hand hold such lances. This is because the reaction thrust force on the lance due to the high pressure nozzle spray that the user must counter is significant. With this reaction force being exerted by the nozzle at the distal end of the lance, an operator can have significant difficulty in managing and precisely positioning the nozzle while countering such forces. For hand held lance operations, typically the reaction forces are limited to no more than ⅓ the weight of the operator, and may be even less in slippery conditions. In addition, there are many situations and confined spaces in which such an elongated wand or lance cannot be used. In such confined spaces the use of very high pressure nozzles may not be used. Therefore there is a need for an apparatus that can carry and manipulate such a nozzle in confined spaces and at the same time maintain a stable nozzle positioning platform counteracting nozzle reaction forces. The present disclosure addresses this need.

SUMMARY OF THE DISCLOSURE

An apparatus for supporting and manipulating a high pressure cleaning nozzle in accordance with the present disclosure may include a wheeled frame or chassis, one or more manipulator elevator rails supported by an elevator rail rotator fastened to the chassis, a horizontal extensible arm rail disposed at an angle to the one or more vertical manipulator rails, a first rotary actuator fastened to a distal end of the horizontal extensible arm rail, and a second actuator orthogonally fastened to the first rotary actuator, wherein the second rotary actuator is configured to releasably hold a high pressure cleaning nozzle attached to a distal end of a high pressure fluid hose.

An exemplary embodiment of a high pressure nozzle manipulator apparatus in accordance with the present disclosure includes a wheeled chassis having a plurality of outriggers movably fastened to the wheeled chassis, a pair of parallel manipulator elevator rails supported by an elevator rail rotator fastened to the chassis, a horizontal extensible arm rail disposed between and carried by the manipulator elevator rails, a rotary wrist actuator fastened to a distal end of the horizontal extensible arm rail, a linear actuator fastened between the rotary actuator and a hinged nozzle support bracket. A portion of the bracket is configured to hold a high pressure cleaning nozzle therein. The linear actuator is configured to rotate the nozzle and the hinged bracket through an arc orthogonal to a plane of rotation of the rotary wrist actuator.

The elevator rail rotator is configured to rotate the one or more elevator rails through an arc of about 180 degrees about an elevator rail rotator axis, typically parallel to the horizontal extensible arm rail. The rotary wrist actuator is configured to rotate the hinged nozzle support bracket through about a 270 degree arc in a plane orthogonal to a horizontal axis through the extensible arm rail. An L shaped carriage assembly is movably fastened to a distal portion of the elevator rails and can be translated along the elevator rails between the distal and proximal ends of the elevator rails. The carriage assembly supports the horizontal extensible arm rail so as to extend the arm rail between the elevator rails. An air actuator is fastened to the carriage assembly for movement of the carriage along the elevator rails. Similarly, another air actuator is fastened to the carriage assembly for translation of the horizontal extensible arm rail so as to extend and retract the rotary wrist actuator fastened to the distal end of the horizontal extensible arm rail.

A remote control panel containing a three position control valve for each of the actuators is preferably located outside the water blast zone around an object to be cleaned. Suitable pneumatic hoses are connected between the control panel and each of the actuators of the apparatus. This control panel preferably includes five spring loaded control valves for controlling the movement of the extensible arm rail, the rotation of the elevator rails, elevation of the extensible arm rail, rotation of the wrist, and adjusting the angle of the nozzle support bracket attached to the wrist.

BRIEF DESCRIPTION OF THE DRAWINGS

The disclosure will be better understood and objects, other than those set forth above, will become apparent when consideration is given to the following detailed description. Such description makes reference to the accompanying drawings wherein.

DETAILED DESCRIPTION

In the following description, numerous specific details are set forth in order to provide a more thorough disclosure. It will be apparent, however, to one skilled in the art, that the art disclosed may be practiced without these specific details. In some instances, well-known features may have not been described in detail so as not to obscure the art disclosed.

Figure 1:
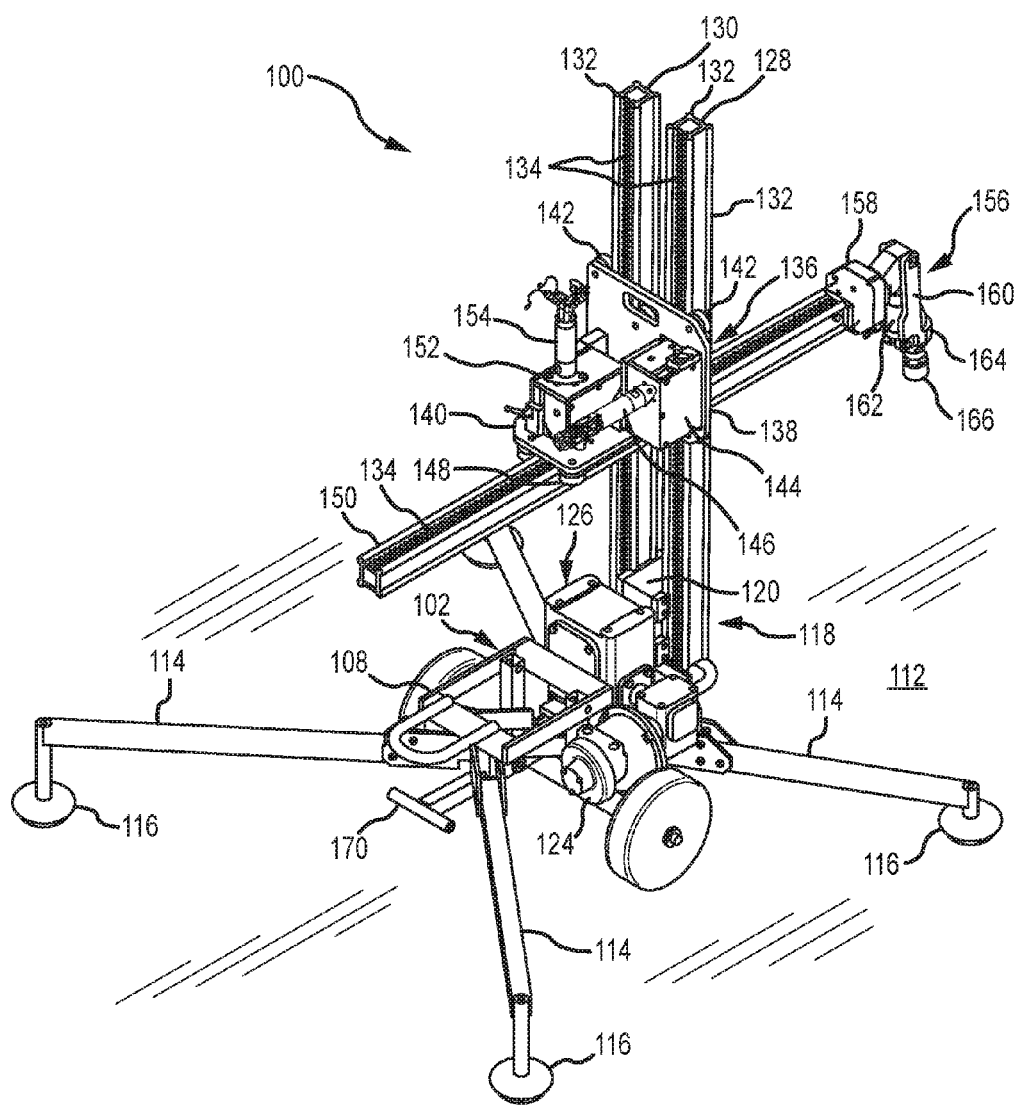
FIG. 1 is a perspective view of the manipulator apparatus of an illustrative embodiment incorporating features of the present disclosure deployed in a support configuration on a floor or other generally flat support surface.
Figure 2:
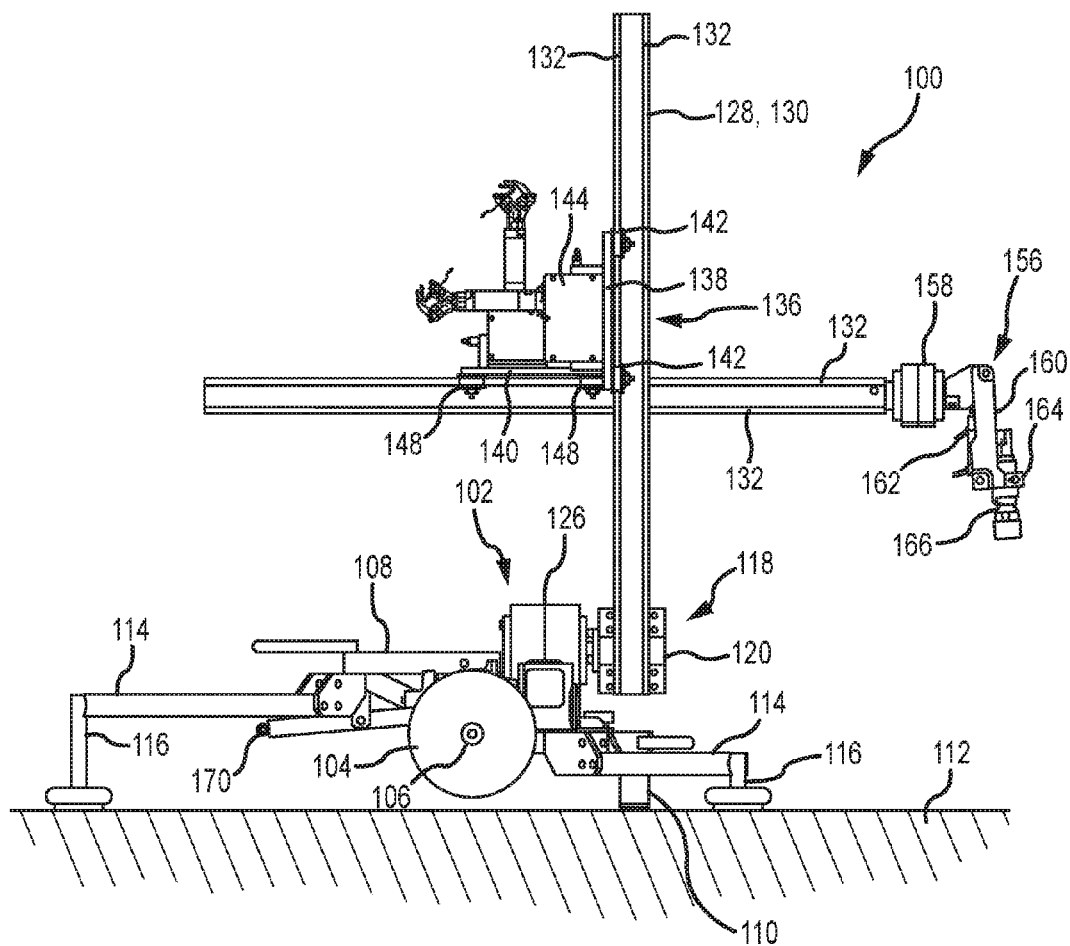
FIG. 2 is a side view of the manipulator apparatus shown in FIG. 1.

One exemplary embodiment 100 of a manipulator apparatus is shown in a perspective view in FIG. 1 and in a side view in FIG. 2. This embodiment of the manipulator apparatus 100 is shown deployed in an operating position in FIGS. 1 and 2. This same apparatus 100 is shown in a transport position in FIGS. 3 and 4.

The manipulator apparatus 100 is movably supported on a wheeled chassis 102 by a pair of wheels 104 on a common axle 106 supporting the chassis 102. The chassis 102 in this embodiment includes a generally rectangular box frame 108 fastened to the axle 106. One end of the rectangular frame supports a central forward support leg 110 that extends downward from the frame to the support surface 112 on which the apparatus 100 may roll. This support leg 110 is preferably sized to support, in conjunction with the wheels 104, the frame 108 in a plane generally parallel to and spaced above the support surface 112 when the apparatus 100 is being jockeyed around on the surface 112 into position for use. Alternatively a pair of spaced apart support legs 110 (not shown) may be provided extending from each forward corner of the frame 108 in place of the single central support leg 110 for additional lateral support.

Figure 3:
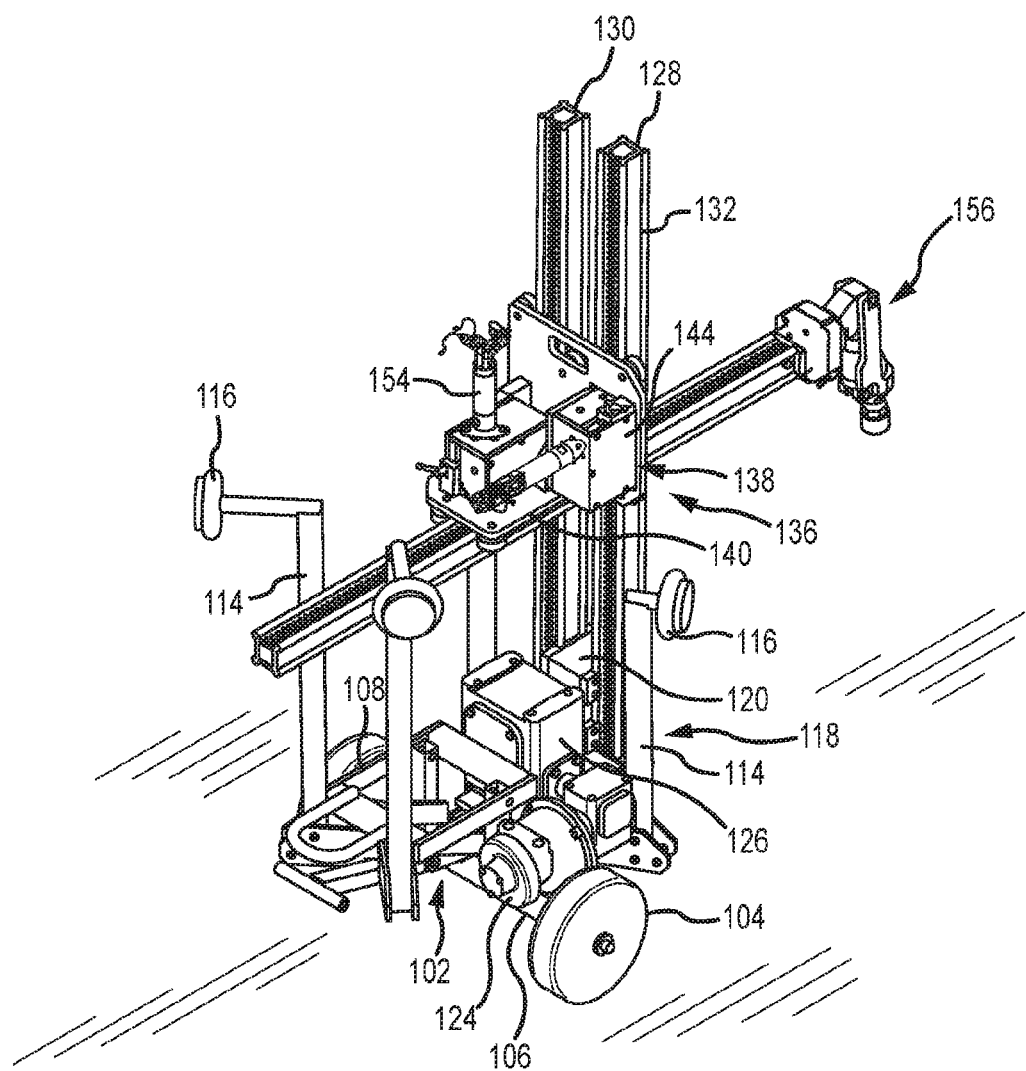
FIG. 3 is a perspective view of the manipulator apparatus shown in FIG. 1 in a folded transport configuration with its outrigger support legs folded up for transport.
Figure 4:
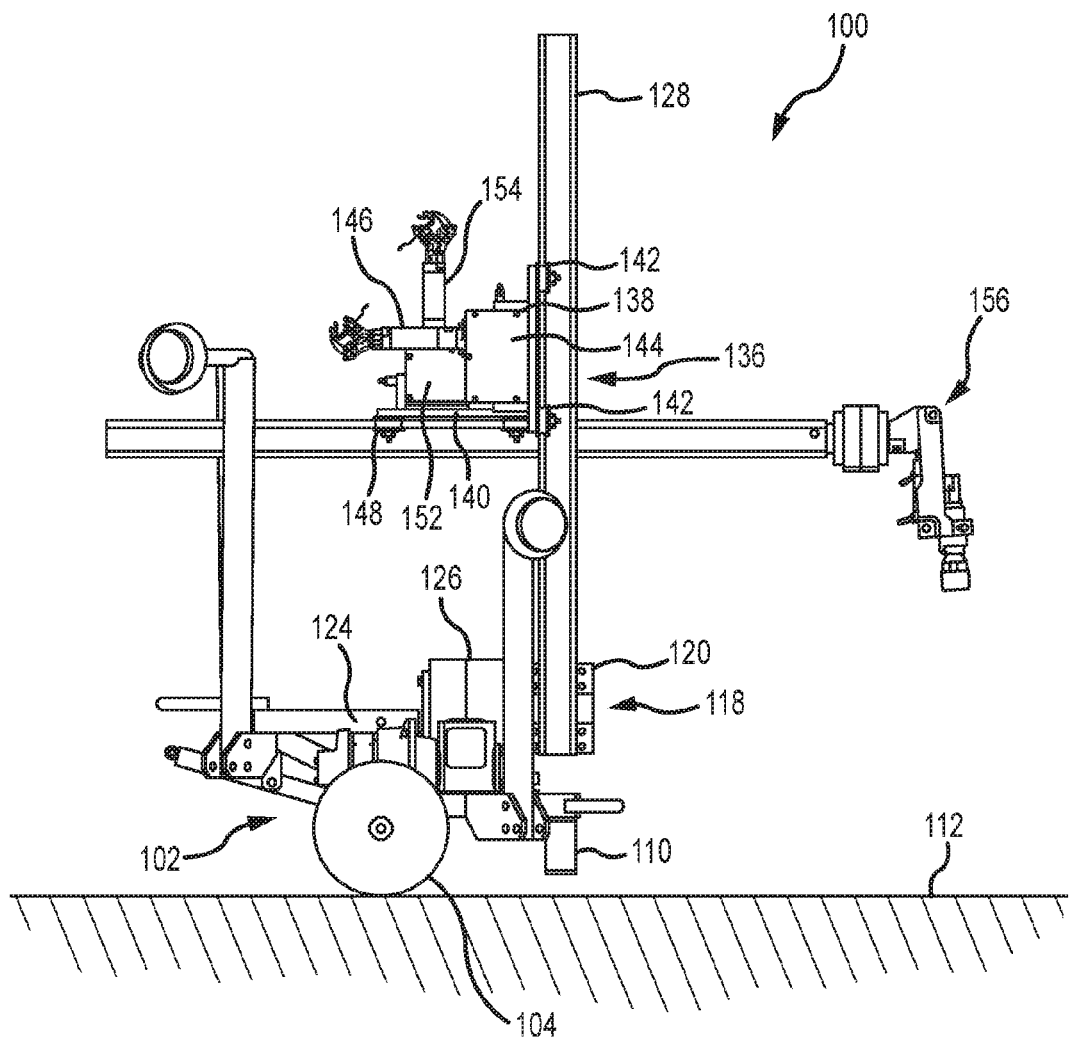
FIG. 4 is a side view of the manipulator apparatus with the outrigger support legs folded up for transport as shown in in FIG. 3.

Fastened to each of the four corners of the rectangular frame 108 is a hinged outrigger 114 that has a resilient vibration absorbing foot 116 at its distal end and a pivot hinge at its proximal end. In FIGS. 1 and 2 the manipulator apparatus 100 is shown with the hinged outriggers 114 in a deployed support configuration in which each outrigger 114 extends generally parallel to and above the support surface 112. In the deployed position shown in FIGS. 1 and 2, these outriggers 114 provide a wide stance stable support for the apparatus 100. These outriggers 114 may be rotated at their proximal ends to a vertical orientation for transport of the apparatus 100, as illustrated in FIGS. 3 and 4.

Each of the outriggers 114 has at its distal end an adjustable height foot 116. The adjustable feet 116 are used to compensate for any unevenness in the generally horizontal support surface 112. Each foot 116 may include a circular disc shaped bottom carrying a resilient pad and a threaded stem extending upright from the disc bottom into a complementary threaded vertical transverse bore through the distal end of the outrigger 114. Adjustment of the foot 116 may be made by screwing the foot 116 into and out of the outrigger 114. Alternatively, for use of the apparatus 100 on an support surface 112 such as uneven ground, rock or soil, the feet 116 may be replaced with claws or spikes to bite into the support surface 112. The outrigger 114 ends could optionally be fitted out with clamping devices instead of feet 116 for holding onto grating or other structures.

Fastened to the chassis 108 is an elevator rail rotator gearbox assembly 118. This rotator gearbox assembly 118 is fastened rigidly to the chassis 108 and its output shaft rotates an elevator rail support block 120 about a horizontal axis through the elevator support block 120. The rotator gearbox assembly 118 includes an air motor 124 connected through a worm drive gear box 126 to the elevator rail support block 120. This elevator rail rotator gearbox assembly 118 could conceivably rotate he elevator rail support block 120 through a full 360°. However, as is shown in the FIGS, such rotation in the illustrated embodiment is limited by the presence of the support surface 112 to an arc of about 180°. If the apparatus 100 were to be mounted on a different surface or structure, however, the gearbox assembly 118 could be configured to rotate through an appropriate arc for that particular structure.

The elevator rail support block 120 has a generally rectangular block shape with parallel sides. Fastened to opposing sides of the support block 120 are proximal ends of two parallel elevator rails 128 and 130. Each of the elevator rails 128 and 130 is preferably an elongated aluminum box rail extrusion having a square cross sectional shape with axially extending ribs 132 at each corner. At least one outer surface of each of the rails 128 and 130 has a longitudinally spaced series of ladder notches 134. Each of the notches has a shape complementary to a corresponding spur drive sprocket (not shown) as is further explained below.

The elevator rails 128 and 130 are rigidly fastened in a spaced parallel relationship at their proximal ends to the elevator rail support block 120. Spaced from the proximal ends and above the chassis 102 is an L shaped platform carriage 136. A tie rail stop block (not shown) is fastened between and across the distal ends of the rails 128 and 130 to maintain the rails 128 and 130 parallel.

This carriage 136 has a generally rectangular vertical plate portion 138 and a generally rectangular horizontal portion 140 rigidly fastened to the vertical plate portion 138. The carriage 136 is movably captured on each of the elevator rails 128 and 130 by a plurality of guide wheels 142 rotatably fastened to an underside of the vertical plate portion 138. These guide wheels 142 each engage one of the ribs 132 of the rails 128 or 130.

Fastened to an upper surface of the vertical plate portion 138 is a vertical drive gearbox 144 carrying a vertical drive air motor 146. The vertical drive gearbox 144 carries a spur drive sprocket (not shown), that engages the ladder notches 134 in the right hand rail 128 as shown in FIG. 1. The configuration as shown in FIGS. 1-4 is merely exemplary. Alternatively, the vertical drive gearbox 144 could be mounted on the opposite side of the vertical plate portion 138 such that the vertical drive gearbox 144 is aligned over the ladder notches 134 in the rail 130 instead of rail 128.

As stated above, the horizontal plate portion 140 is rigidly fastened to the vertical plate portion 138. A plurality of guide wheels 148, preferably four, is fastened to the underside surface of the horizontal plate portion 140. A horizontal arm rail 150 is supported between the guide wheels 148 riding on the rail ribs 132 of the rail 150. This rail 150 extends between the pair of parallel elevator rails 128 and 130. These guide wheels 148 thus suspend the arm rail 150 beneath the carriage 136 and above the chassis 102 and movably fasten the arm rail 150 to the carriage 136. It is to be understood that this configuration illustrated in FIGS. 1-4 is merely exemplary. For example, the carriage 136 could be inverted such that the horizontal arm rail 150 is carried above the carriage 136 rather than suspended beneath as is shown.

This horizontal arm rail 150 is also an elongated metal extrusion having a rectangular cross section with axially extending ribs 132 along each corner of the cross section. As with the elevator rails 128 and 130, an upper surface of the horizontal arm rail 150, in the configuration shown, has a series of ladder notches 134.

A horizontal drive gearbox 152 is fastened to the upper surface of the horizontal plate portion 140 of the carriage 136. The horizontal drive gearbox 152 carries internally another spur drive sprocket (not visible) that engages the ladder notches 134 in the horizontal arm rail 150. A horizontal arm air motor 154 is fastened to the gearbox 152 and operates to rotate the spur drive sprocket that engages the ladder notches 134 so as to independently extend and retract the horizontal arm rail 150 from between the elevator rails 128 and 130.

An articulated nozzle support assembly 156 is fastened to the distal end of the horizontal arm rail 150. This nozzle support assembly 156 has a pneumatically actuated rotatable wrist 158 and a hinged nozzle support bracket 160 fastened to the wrist 158. The rotatable wrist 158 may be rotated completely through about 270 degrees of rotation about the distal end of the arm rail 150. A pneumatic actuator 162 is fastened between the hinged bracket 160 and the wrist 158. The hinged bracket 160 can rotate about its hinge through an arc of about 90 degrees. A clamp 164 on the bracket 160 releasably holds a nozzle 166.

This nozzle 166 is mechanically fastened to a distal end of a high pressure fluid hose (not shown) that feeds water or other wash fluid at very high pressures, on the order of thousands of pounds per square inch, to the nozzle 166. As mentioned above, the nozzle 166, in the position as is shown in FIG. 1, can be rotated by the pneumatic actuator 162 through an arc preferably of about 90° about the hinge of bracket 160. The rotatable wrist 158, at the same time, can preferably be rotated about 270° about the central axis of the horizontal rail 150. This rotational limit is to prevent undue twisting of the high pressure hose attached to the nozzle 166. Simultaneously or sequentially, the elevator rails 128 and 130, carrying the carriage 136 with the horizontal rail 150 and nozzle support assembly 156, can generally also be rotated through an arc of about 180° in a vertical plane about the axis of the elevator rotator assembly 118, which is aligned along the chassis 102 above the support surface 112. However, if the apparatus 100 is suitably positioned on different support surface that does not protrude beyond the rotator assembly 118, the elevator rails 128 and 130 carrying the carriage 136 could conceivably be rotated through a much larger arc via rotator assembly 118. Finally, the horizontal arm 150 may be extended and retracted its full length independently of the rotations just described, and the carriage 136 may be independently raised and lowered on the elevator rails 128 and 130 whenever desired by an operator.

The apparatus 100 is designed to remain stable and fully handle the nozzle 166 reaction forces throughout the range of operating pressures of waterblasting tools. This range extends from about 1 kpsi up to about 40 kpsi, with nozzle reaction forces up to at least about 300 ft-lbs. This flexibility of maneuvering the manipulator apparatus 100 according to the present disclosure also has the potential to permit an operator standing remote from an actual cleaning operation to precisely position a high pressure nozzle 166 so as to reach areas to be cleaned that heretofore could not be reached safely.

The common axle 106 is fastened to the chassis frame 108 via a lift linkage 170 that permits the chassis 102 to be raised or lowered. In a lowered position of the chassis 102, the wheels 104 are raised off the support surface 112. In a raised position of the chassis 102, as shown in FIGS. 3 and 4, the wheels 104 are lowered below the extended position of the outriggers 114 such that the wheels 104 support the apparatus 100. This permits the outriggers 114 to be raised to the position shown in FIGS. 3 and 4. In this case, the apparatus 100 is supported via the wheels 104 and the forward support leg 110.

Figure 5:
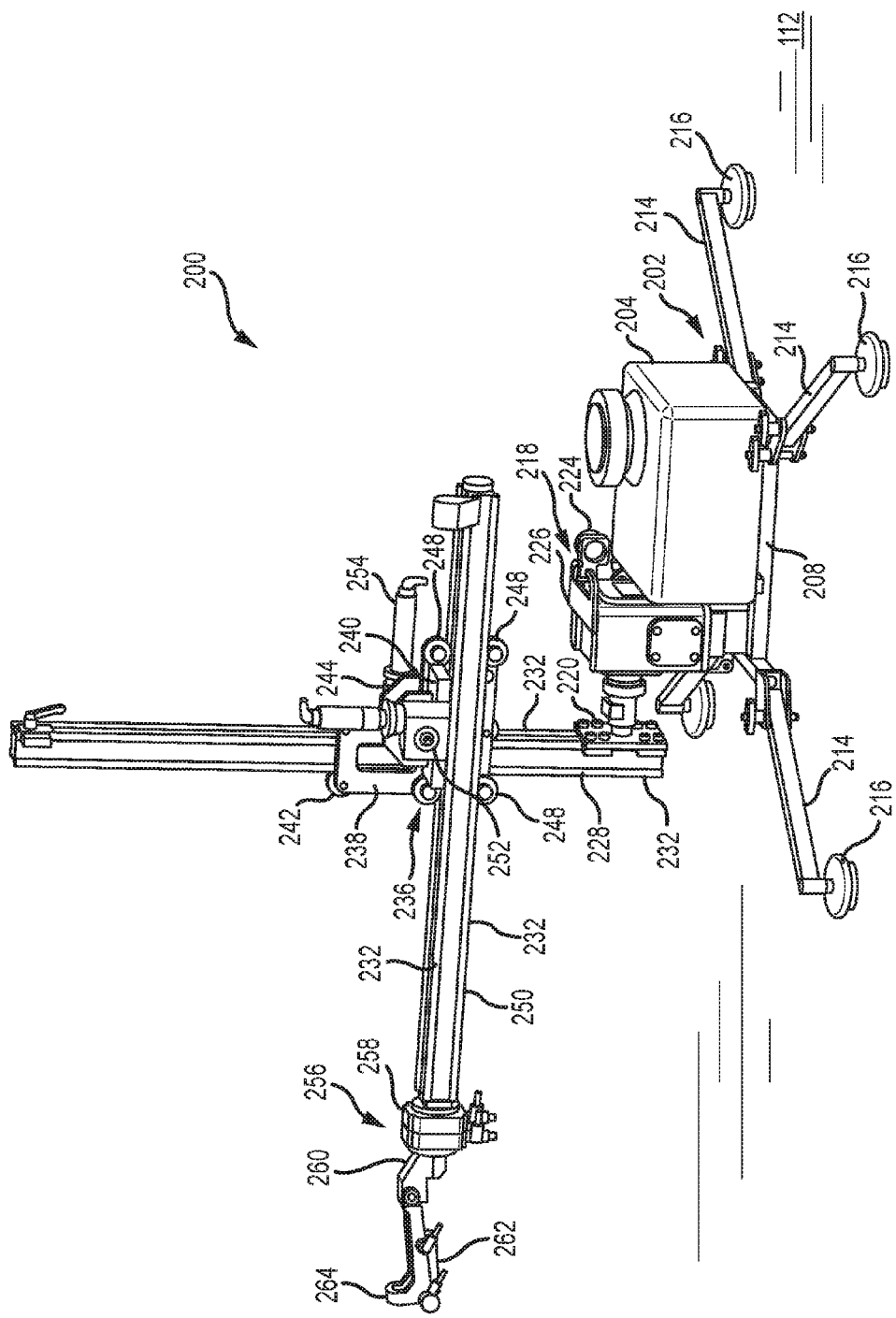
FIG. 5 is a perspective view of a lightweight manipulator apparatus in accordance with the present disclosure.

A lightweight alternative embodiment 200 is shown in FIG. 5. This embodiment 200 is designed to perform as above described with respect to embodiment 100 but having a reduced overall weight so as to be easily transported between operational locations. However, because of this reduced weight, it is useful only for a much lower range of operational reaction forces than apparatus 100. In this exemplary manipulator apparatus 200, it can support up to about 200 ft-lbs of reaction force.

The manipulator apparatus 200 is movably supported on a chassis 202. The chassis 202 in this embodiment is a rectangular box frame 208. Also attached to the frame 208 is a ballast weight tank 204. This tank 204 provides, when filled with water, about 6 gallons of ballast weight of about 55 lbs., to compensate for nozzle thrust during manipulator operation. A larger tank may alternatively be utilized, depending on the service requirements and the space into which the apparatus might need to be located, such as within a tank or other vessel. Additionally, or alternatively, the tank 204 may be filled with sand, or steel billets can be added for additional weight as needed.

Fastened to each of the four corners of the rectangular frame 208 is a hinged outrigger 214 that has a resilient vibration absorbing foot 216 at its distal end and a pivot hinge at its proximal end. In the deployed position shown in FIG. 5, these outriggers 214 provide a wide stance stable support for the apparatus 200. These outriggers 214 may be rotated horizontally at their proximal ends to a folded orientation for transport of the apparatus 200. In the exemplary configuration shown in FIG. 5, the apparatus 200 may be folded and inserted through a man-way opening as small as about 21 inches in diameter.

Each of the outriggers 214 has at its distal end an adjustable height foot 216. The adjustable feet 216 are used to compensate for any unevenness in the generally horizontal support surface 112 similar to that shown in FIG. 1. Each foot 216 may include a circular disc shaped bottom carrying a resilient pad and a threaded stem extending upright from the disc bottom into a complementary threaded vertical transverse bore through the distal end of the outrigger 214. Alternatively, each foot 216 may be configured with a strong magnet disc or block for use of the apparatus 200 within a steel tank or on steel decking where magnetic attachment could be advantageous. In such a situation, it may also be possible to eliminate the necessity of filling or using the ballast tank 204.

Adjustment of the foot 216 may be made by screwing the foot 216 into and out of the outrigger 214. Alternatively, for use of the apparatus 200 on an support surface 112 such as uneven ground, rock or soil, the feet 216 may be replaced with claws or spikes to bite into the support surface 112. The outrigger 214 ends could optionally be fitted out with clamping devices instead of feet 216 for holding onto grating or other structures.

Fastened to the chassis 208 is an elevator rail rotator gearbox assembly 218. This rotator gearbox assembly 218 is fastened rigidly to the chassis 208 and its output shaft rotates an elevator rail support block 220 about a horizontal axis through the elevator support block 220. The rotator gearbox assembly 218 includes an air motor 224 connected through a worm drive gear box 226 to the elevator rail support block 220. This elevator rail rotator gearbox assembly 218 could conceivably rotate the elevator rail support block 220 through a full 360°. However, as is shown in FIG. 5, such rotation in the illustrated embodiment is limited by the presence of the support surface 112 to an arc of about 180°. If the apparatus 200 were to be mounted on a different surface or structure, however, the gearbox assembly 218 could be configured to rotate through an appropriate arc for that particular structure.

The elevator rail support block 220 has a generally rectangular block shape with parallel sides. Fastened to one face of the support block 220 is a proximal end of an elevator rail 228. In this embodiment, only a single rail is needed due to the reduced thrust, and in order to save weight. Elevator rail 228 is preferably an elongated aluminum box rail extrusion having a square cross sectional shape with axially extending thickened ribs 232 at each corner. At least one outer surface of the rail 228 has a longitudinally spaced series of ladder notches (not shown) as in the first embodiment 100. Each of the notches has a shape complementary to a corresponding spur drive sprocket (not shown) as explained above with reference to embodiment 100.

Spaced from the proximal end of the rail 228 above the chassis 102 is an L shaped platform carriage 236. This carriage 236 has a generally rectangular vertical plate portion 238 and a generally rectangular horizontal portion 240 rigidly fastened to the vertical plate portion 238. The carriage 236 is movably captured on the elevator rail 228 by a plurality of guide wheels 242 rotatably fastened to an underside of the vertical plate portion 238. These guide wheels 242 each engage one of the ribs 232 of the rail 228.

Fastened to an upper surface of the vertical plate portion 238 is a vertical drive gearbox 244 carrying a vertical drive air motor 146. The vertical drive gearbox 244 carries a spur drive sprocket (not shown), that engages the ladder notches in the rail 228. As stated above, the horizontal plate portion 240 is rigidly fastened to the vertical plate portion 238. A plurality of guide wheels 248, preferably four, is fastened to the horizontal plate portion 140. A horizontal arm rail 250 is supported between the guide wheels 248 riding on the rail ribs 232 of the rail 250. This rail 250 extends orthogonally to the elevator rail 128. These guide wheels 248 thus suspend the arm rail 250 beneath the carriage 236 and above the chassis 202 and movably fasten the arm rail 250 to the carriage 236. It is to be understood that this configuration illustrated in FIG. 5 is merely exemplary. For example, the carriage 236 could be inverted such that the horizontal arm rail 250 is carried above the carriage 236 rather than suspended beneath as is shown.

This horizontal arm rail 250 is also an elongated metal extrusion having a rectangular cross section with axially extending ribs 232 along each corner of the cross section. As with the elevator rail 228, an upper surface of the horizontal arm rail 250, in the configuration shown, has a series of ladder notches 134.

A horizontal drive gearbox 252 is fastened to the upper surface of the horizontal plate portion 240 of the carriage 236. The horizontal drive gearbox 252 carries internally another spur drive sprocket (not visible) that engages the ladder notches 134 in the horizontal arm rail 250. A horizontal arm air motor 254 is fastened to the gearbox 252 and operates to rotate the spur drive sprocket that engages the ladder notches 134 so as to independently extend and retract the horizontal arm rail 250 from between the elevator rail 228.

An articulated nozzle support assembly 256 is fastened to the distal end of the horizontal arm rail 250. This nozzle support assembly 256 has a pneumatically actuated rotatable wrist 258 and a hinged nozzle support bracket 260 fastened to the wrist 258. The rotatable wrist 258 may be rotated completely through about 270 degrees of rotation about the distal end of the arm rail 250 as in the first embodiment described above. A pneumatic actuator 262 is fastened between the hinged bracket 260 and the wrist 258. The hinged bracket 260 can rotate about its hinge through an arc of about 90 degrees. A clamp 264 on the bracket 260 releasably holds a nozzle 166 (not shown in FIG. 5). Operation of the nozzle 166 is as described above with reference to the first embodiment 100.

The apparatus 200 is designed to remain stable and fully handle the nozzle 166 reaction forces throughout a reduced range of operating reaction forces and can operate through a pressure range up to about 40,000 psi, currently the full range of pressures for waterblasting tools, with nozzle reaction forces in this lightweight embodiment limited to about 200 ft-lbs. The flexibility of handling and maneuvering the manipulator apparatus 100 and lightweight apparatus 200 according to the present disclosure also has the potential to permit an operator standing remote from an actual cleaning operation to precisely position a high pressure nozzle 166 so as to reach areas to be cleaned that heretofore could not be reached safely.

Many alternatives and variations of the manipulator apparatus are also contemplated. For example, instead of a wheeled chassis, the chassis 102 or the chassis 202 could be mounted on a set of tracks, on a mechanized transport platform, a tracked vehicle, scaffolding, or an x/y positioner frame. The actuators may be pneumatic, hydraulic or electric. The outriggers 114 and feet 116 and 214, 216 are merely exemplary. They may be replaced with a different configuration fastening structure such as clamps for engaging platform grating or other structures. The pneumatic actuators may be replaced with hydraulic fluid actuators or electric motors in other applications of the either manipulator apparatus 100 or 200. Accordingly, it is intended that the art disclosed shall be limited only to the extent required by the appended claims and the rules and principles of applicable law.

I claim:

1. A high pressure fluid nozzle manipulator apparatus comprising:
    a chassis,
    one or more manipulator elevator rails supported by an elevator rail rotator fastened to the chassis,
    a horizontal extensible arm rail carried by the one or more manipulator elevator rails,
    a rotary wrist actuator fastened to a distal end of the horizontal extensible arm rail, and
    a linear actuator fastened between the rotary actuator and a hinged nozzle support bracket;
    wherein a portion of the bracket is configured to hold a high pressure cleaning nozzle therein, the linear actuator is configured to rotate the nozzle and the bracket through an arc, the elevator rail rotator is configured to rotate the one or more elevator rails through an arc of at least about 180 degrees around an elevator rail rotator axis, and the rotary actuator is configured to rotate the hinged nozzle support bracket in at least about a 270 degree arc in a plane orthogonal to a horizontal axis through the extensible arm rail.

2. The apparatus according to claim 1 wherein the chassis is a wheeled chassis and has a generally rectangular metal frame, and wherein the frame supports an axle fastened to a pair of wheels, the elevator rotator and an elevator rotator drive motor.

3. The apparatus according to claim 2 further comprising a plurality of outriggers movably fastened to the wheeled chassis.

4. The apparatus according to claim 2 wherein the elevator rail rotator is fastened to a proximal end of the one or more elevator rails.

5. The apparatus according to claim 1 further comprising an L shaped carriage assembly movably fastened to a distal portion of the one or more elevator rails and wherein the carriage assembly supports the horizontal extensible arm rail so as to extend at an angle to the one or more elevator rails.

6. The apparatus according to claim 5 wherein the chassis is a wheeled chassis having a generally rectangular metal frame, and wherein the frame supports an axle fastened to a pair of wheels, the elevator rotator and an elevator rotator drive motor.

7. The apparatus according to claim 6 further comprising a plurality of outriggers movably fastened to the wheeled chassis.

8. The apparatus according to claim 6 wherein the elevator rotator is fastened to a proximal end of each of the one or more elevator rails.

9. The apparatus according to claim 5 wherein the linear actuator is configured to rotate the portion of the hinged bracket holding the nozzle through an arc orthogonal to a plane of rotation of the rotary actuator wrist fastened to the end of the horizontal rail.

10. A high pressure nozzle manipulator apparatus comprising:
   a chassis having a plurality of outriggers movably fastened to the chassis, one or more manipulator elevator rails supported by an elevator rail rotator fastened to the chassis;
   a horizontal extensible arm rail carried by the one or more manipulator elevator rails,
   a rotary actuator fastened to a distal end of the horizontal extensible arm rail,
   a linear actuator fastened between the rotary actuator and a hinged nozzle support bracket, wherein a portion of the bracket is configured to hold a high pressure cleaning nozzle therein wherein the linear actuator is configured to rotate the nozzle and the bracket through an arc orthogonal to a plane of rotation of the rotary actuator;
   wherein the elevator rail rotator is configured to rotate the one or more elevator rails through an arc of about 180 degrees about an elevator rail rotator axis, wherein the rotary actuator is configured to rotate the hinged nozzle support bracket in about a 270 degree arc in a plane orthogonal to a horizontal axis through the extensible arm rail; and
   a carriage assembly movably fastened to a distal portion of the one or more elevator rails and wherein the carriage assembly supports the horizontal extensible arm rail so as to extend between the elevator rails.

11. The apparatus according to claim 10 wherein the chassis is a wheeled chassis and has a generally rectangular metal frame, and wherein the frame supports an axle fastened to a pair of wheels, the elevator rotator and an elevator rotator drive motor.

12. The apparatus according to claim 11 further comprising three or more outriggers movably fastened to the wheeled chassis.

13. The apparatus according to claim 10 wherein the elevator rail rotator is fastened to a proximal end of the one or more elevator rails.

14. The apparatus according to claim 10 further comprising a carriage assembly movably fastened to a distal portion of the one or more elevator rails and wherein the carriage assembly supports the horizontal extensible arm rail so as to extend at an angle to the one or more elevator rails.

15. The apparatus according to claim 14 wherein the chassis is a wheeled chassis having a generally rectangular metal frame, and wherein the frame supports an axle fastened to a pair of wheels, the elevator rotator and an elevator rotator drive motor.

16. The apparatus according to claim 15 further comprising a plurality of outriggers movably fastened to the wheeled chassis.

17. The apparatus according to claim 15 wherein the elevator rotator is fastened to a proximal end of each of the one or more elevator rails.

18. The apparatus according to claim 15 wherein the linear actuator is configured to rotate the portion of the hinged bracket holding the nozzle through an arc orthogonal to a plane of rotation of the rotary actuator wrist fastened to the end of the horizontal rail.

19. The apparatus according to claim 1 further comprising a ballast tank fastened to the chassis.

20. The apparatus according to claim 10 further comprising a ballast tank fastened to the chassis.

* * * * *